(12) United States Patent
Fang et al.

(10) Patent No.: US 6,473,042 B1
(45) Date of Patent: Oct. 29, 2002

(54) ANTENNA FOR AN ELECTRONIC DEVICE

(75) Inventors: Chien-Hsing Fang, Taichung Hsien (TW); Chun-Chain Yu, Taichung Hsien (TW)

(73) Assignee: Acer Neweb Corporation, Taipei Hsien (TW)

( * ) Notice: Subject to any disclaimer, the term of this patent is extended or adjusted under 35 U.S.C. 154(b) by 0 days.

(21) Appl. No.: 09/950,837

(22) Filed: Sep. 13, 2001

(30) Foreign Application Priority Data

Apr. 11, 2001 (TW) ........................................ 090205625

(51) Int. Cl.$^7$ ................................................. H01Q 1/38
(52) U.S. Cl. ................................ 343/700 MS; 343/702; 343/767; 343/770
(58) Field of Search .......................... 343/700 MS, 702, 343/767, 770, 846, 848

(56) References Cited

U.S. PATENT DOCUMENTS

| | | | | |
|---|---|---|---|---|
| 4,751,513 A | * | 6/1988 | Daryoush et al. | 343/700 MS |
| 5,420,596 A | * | 5/1995 | Burrell et al. | 343/700 MS |
| 5,777,581 A | * | 7/1998 | Lilly et al. | 333/33 |
| 6,147,652 A | * | 11/2000 | Sekine | 343/700 MS |
| 6,218,991 B1 | * | 4/2001 | Sanad | 343/700 MS |
| 6,222,496 B1 | * | 4/2001 | Liu | 343/700 MS |
| 6,282,433 B1 | * | 8/2001 | Holshouser | 343/702 |
| 6,297,776 B1 | * | 10/2001 | Pankinaho | 343/700 MS |

* cited by examiner

Primary Examiner—Tan Ho
(74) Attorney, Agent, or Firm—Baker Botts L.L.P.

(57) ABSTRACT

An antenna includes a conductive radiating plate unit, a conductive grounding plate unit vertically spaced apart from and electrically connected to the radiating plate unit, and a conductive signal feeding leg electrically connected to the radiating plate unit and spaced apart from the grounding plate unit. At least one of the radiating plate unit and the grounding plate unit is extendable.

16 Claims, 6 Drawing Sheets

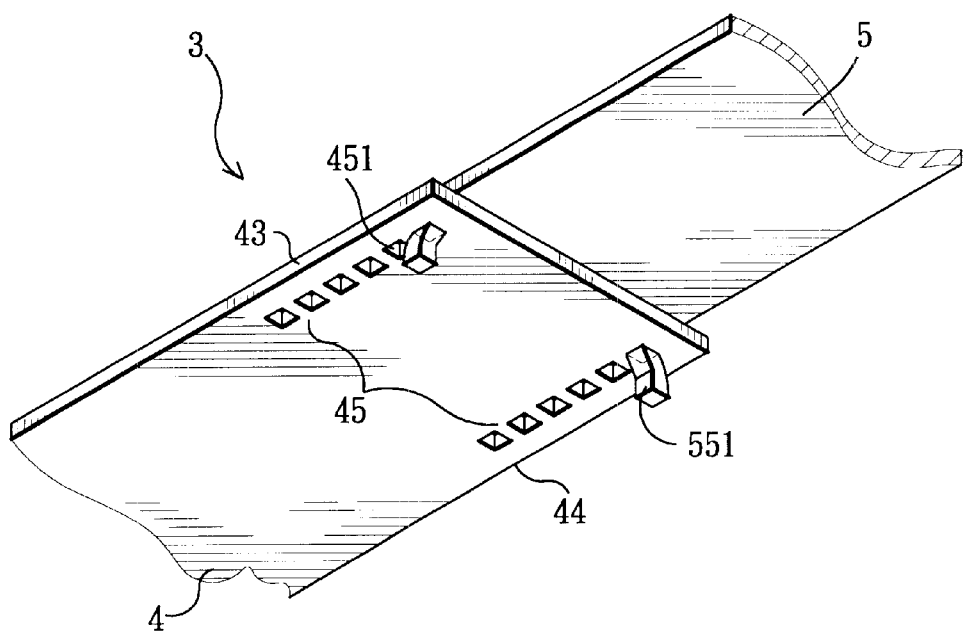
F I G. 3
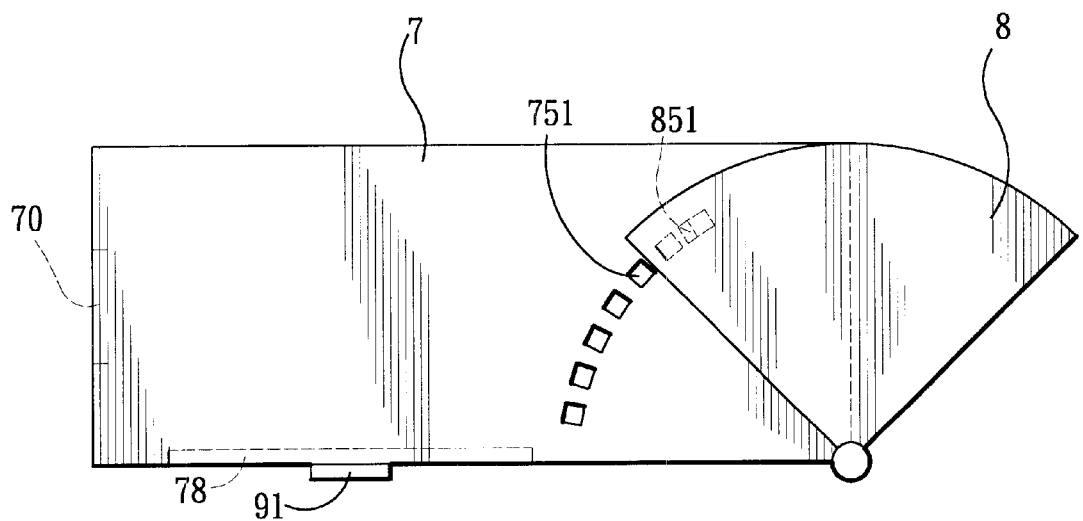
F I G. 4

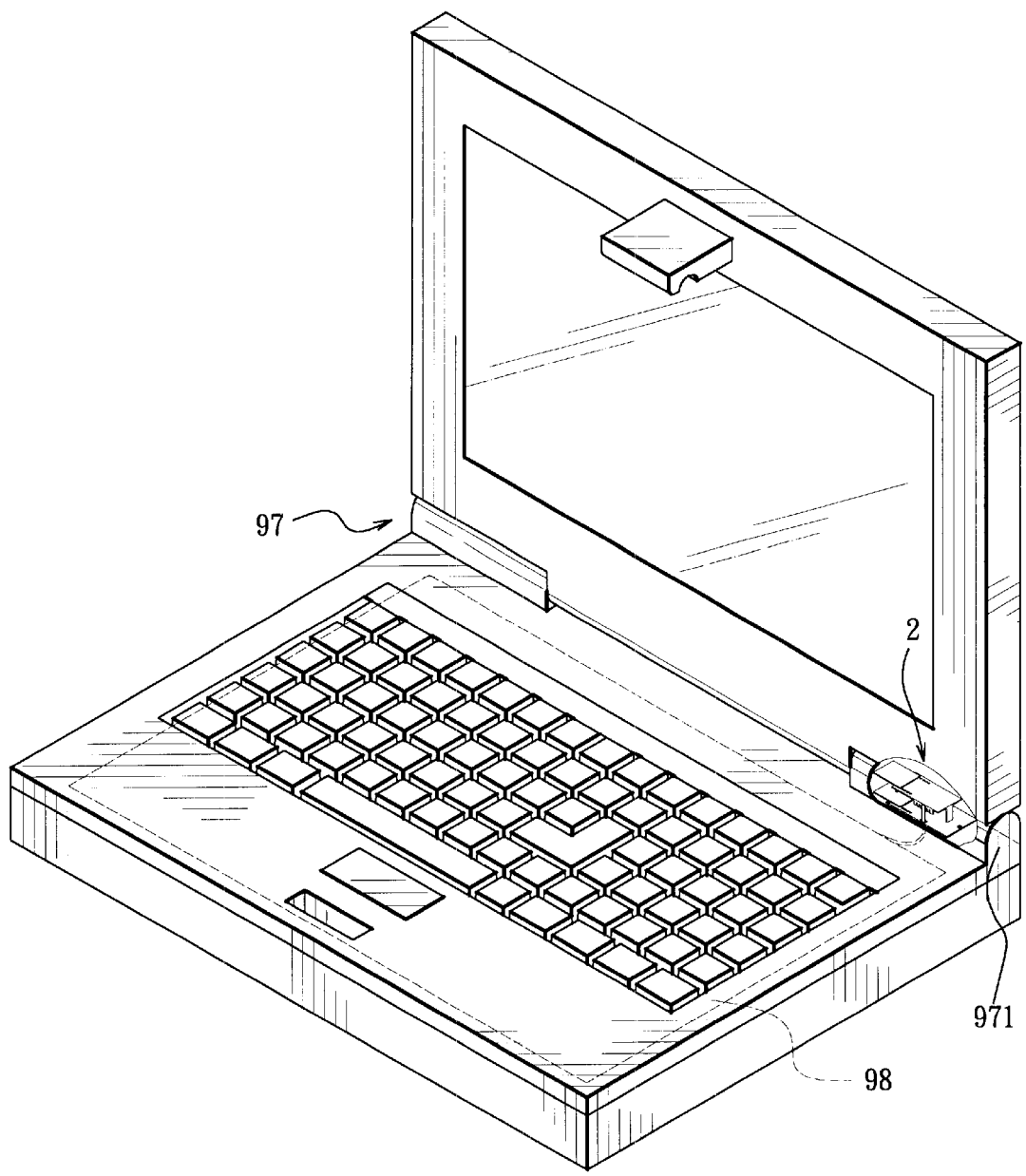
F I G. 6

ANTENNA FOR AN ELECTRONIC DEVICE

CROSS-REFERENCE TO RELATED APPLICATION

This application claims priority of Taiwan patent Application No. 90205625, filed on Apr. 11, 2001

BACKGROUND OF THE INVENTION

1. Field of the invention

This invention relates to an antenna for an electronic device.

2. Description of the related art

Wireless communication devices, such as cellular phones, notebook computers, electronic appliances, and the like, are normally installed with an antenna that serves as a medium for transmission and reception of electromagnetic signals. The antenna can be built outside or inside the devices. However, the latter (built-in type) are more attractive due to a tendency of folding and breaking for the former upon use.

FIG. 1 illustrates a conventional plate-type antenna 1 which is commonly known as PIFA (Planar Inverted-F Antenna) and which includes a rectangular conductive radiating plate 11, a rectangular conductive grounding plate 12 that is vertically spaced apart from and that is electrically connected to the radiating plate 11 via a conductive grounding leg 13, and a conductive signal feeding leg 14 that projects from one side of the radiating plate 11 and through an opening in the grounding plate 12 (the signal feeding leg 14 is spaced apart from the grounding plate 12) and that is adapted to be electrically connected to an electromagnetic transmitter and an electromagnetic receiver (not shown).

Frequency, input impedance, and bandwidth are key parameters for the design of an antenna for a specific use, and are mainly, but not exclusively, related to the dimension of the radiating plate 11, the dimension of the grounding plate 12, and the position of the electrical contact between the signal feeding leg 14 and the radiating plate 11. The parameters are interrelated such that a modification in one of the parameters causes corresponding changes in the other two.

The aforesaid conventional antenna is disadvantageous in that since the dimension of the radiating plate 11, the dimension of the grounding plate 12, and the position of the electrical contact between the signal feeding leg 14 and the radiating plate 11 are all fixed, it can only be used for a specific application that requires a specific frequency, input impedance, and bandwidth, and thus lacks flexibility.

SUMMARY OF THE INVENTION

Therefore, it is an object of the present invention to provide a plate-type antenna that is capable of overcoming the aforementioned drawbacks.

It is another object of the present invention to provide a slot-type antenna that is capable of overcoming the aforementioned drawbacks.

According to one aspect of this invention, there is provided a plate-type antenna for an electronic device. The plate-type antenna comprises: a conductive radiating plate unit; a conductive grounding plate unit vertically spaced apart from and electrically connected to the radiating plate unit; and a conductive signal feeding leg electrically connected to the radiating plate unit, spaced apart from the grounding plate unit, and adapted to be connected to an electromagnetic transmitter and an electromagnetic receiver. At least one of the radiating plate unit and the grounding plate unit is extendable to adjust the behavior of the antenna.

According to another aspect of this invention, there is provided a slot-type antenna for an electronic device. The slot-type antenna comprises: a conductive main plate extending in a longitudinal direction, formed with a slot, and having a first plate portion that surrounds the slot and that defines a periphery of the slot, and a second plate portion that extends from one side of the first plate portion in a transverse direction relative to the longitudinal direction; a conductive signal feeding leg electrically connected to the first plate portion of the main plate and adapted to be connected to an electromagnetic transmitter and an electromagnetic receiver; and a conductive extension plate electrically, adjustably, and selectively connected to one of the first and second plate portions so as to permit extension and retraction of the main plate in the longitudinal direction and vary the dimension of the slot that is exposed from the main plate and the extension plate when the extension plate is connected to the first plate portion, and so as to permit extension and retraction of the main plate in the transverse direction when the extension plate is connected to the second plate portion.

BRIEF DESCRIPTION OF THE DRAWINGS

In drawings which illustrate embodiments of the invention,

FIG. 3 is a fragmentary perspective view of the plate-type antenna of FIG. 2;

FIG. 4 is a fragmentary perspective view of another preferred embodiment of the plate-type antenna modified from the embodiment of FIG. 2;

FIG. 6 is a perspective view of an electronic device with the plate-type antenna of FIG. 2.

DETAILED DESCRIPTION OF THE PREFERRED EMBODIMENTS

Figure 1:
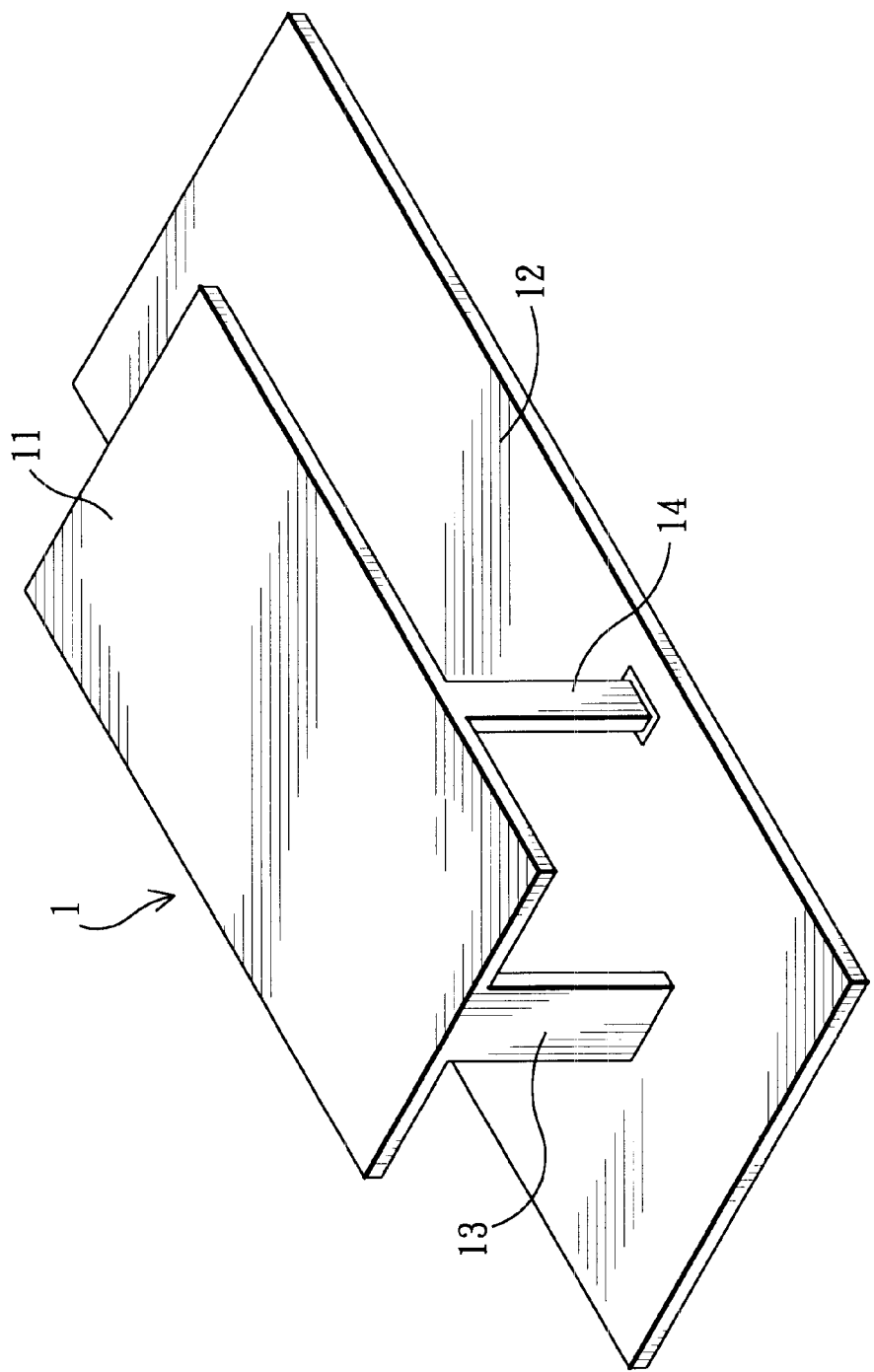
FIG. 1 is a perspective view of a conventional plate-type antenna.
Figure 2:
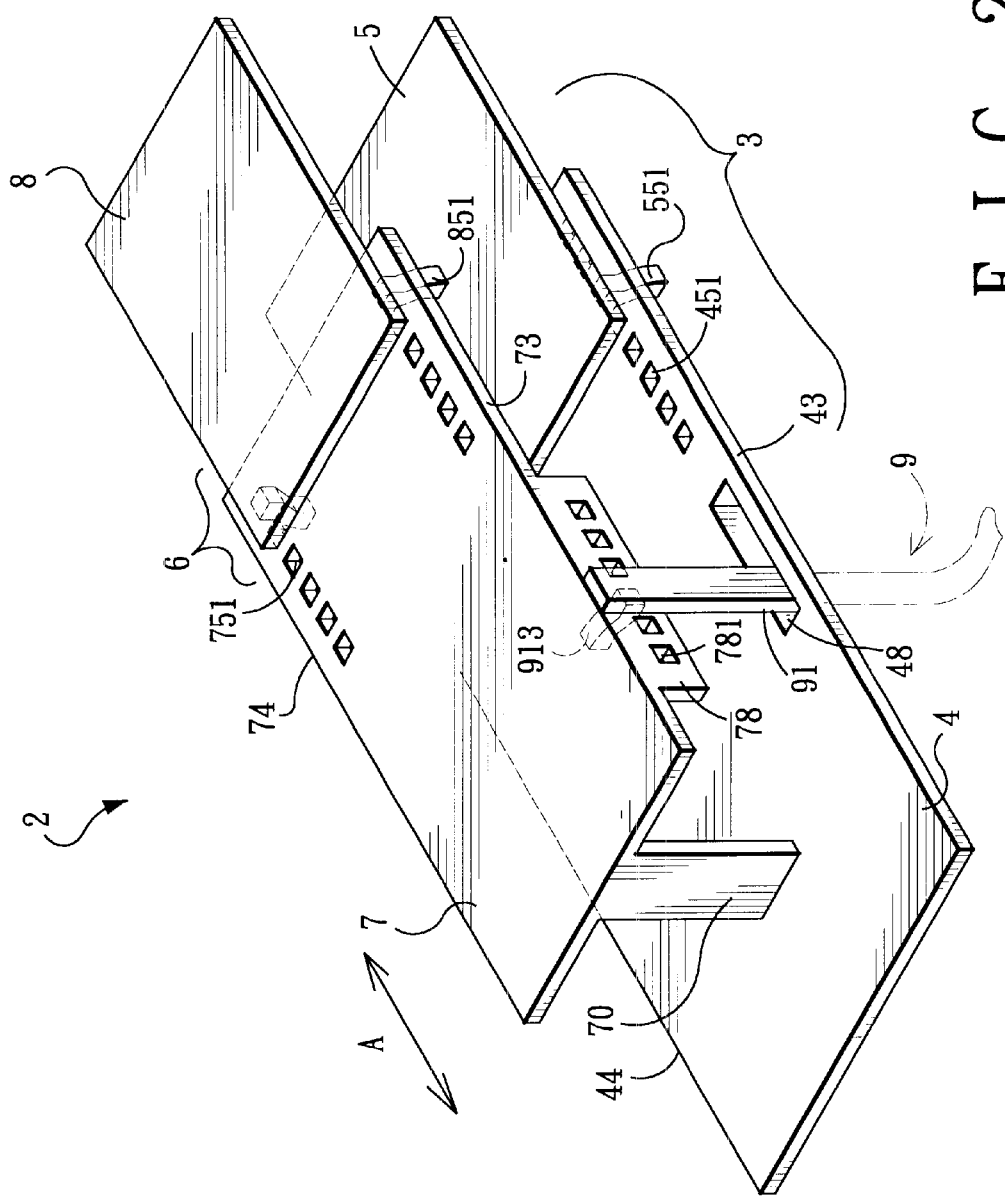
FIG. 2 is a perspective view of a preferred embodiment of a plate-type antenna of this invention.

FIGS. 2 and 3 illustrate a preferred embodiment of a plate-type antenna 2 of this invention. The plate-type antenna 2 includes: a conductive radiating plate unit 6; a conductive grounding plate unit 3 vertically spaced apart from and electrically connected to the radiating plate unit 6 via a conductive grounding leg 70; and a conductive signal feeding leg 91 electrically connected to the radiating plate unit 6, spaced apart from the grounding plate unit 3, and adapted to be connected to an electromagnetic transmitter and an electromagnetic receiver (not shown). The radiating plate unit 6 and the grounding plate unit 3 are extendable in a longitudinal direction (A). The plate-type antenna 2 is characterized in that tuning of the communication frequency of the same is mainly achieved by adjustment of the dimension of the radiating plate unit 6, that tuning of the communication bandwidth of the same is mainly achieved by adjustment of the dimension of the grounding plate unit 3, and that adjustment of the input impedance of the same is mainly achieved by varying the position of electrical contact between the signal feeding leg 91 and the radiating plate unit 6.

The radiating plate unit 6 includes rectangular first and second radiating plates 7, 8. A radiating coupling unit of the antenna 2 includes a plurality of retaining holes 751 formed in the first radiating plate 7 and aligned in the longitudinal direction (A) at two opposite sides 73, 74 of the first, radiating plate 7, and a pair of spaced apart retaining protrusions 851 projecting from the second radiating plate 8 and selectively into one of the retaining holes 751 so as to permit extension and retraction of the radiating plate unit 6 in the longitudinal direction (A) and so as to couple the first and second radiating plates 7, 8 in a manner that the first and second radiating plates 7, 8 are in face-to-face contact with each other. It is apparent to one skilled in the art that the retaining holes 751 and the retaining protrusions 851 can be respectively and selectively formed in or on the first and second radiating plates 7, 8.

The grounding plate unit 3 includes rectangular first and second grounding plates 4, 5. A grounding coupling unit of the antenna 2 includes a plurality of retaining holes 451 formed in the first grounding plate 4 and aligned in the longitudinal direction at two opposite sides 43, 44 of the first grounding plate 4, and a pair of spaced apart retaining protrusions 551 projecting from the second grounding plate 5 and selectively into one of the retaining holes 451 so as to permit extension and retraction of the grounding plate unit 3 in the longitudinal direction (A) and so as to couple the first and second grounding plates 4, 5 in a manner that the first and second grounding plates 4, 5 are in face-to-face contact with each other. It is apparent to one skilled in the art that the retaining holes 451 and the retaining protrusions 551 can be respectively and selectively formed in or on the first and second grounding plates 4, 5.

The first radiating plate 7 is provided with a tab 78 projecting downwardly from one of the two opposite sides 73 of the first radiating plate 7. The first grounding plate 4 is formed with an elongated opening 48 that is vertically aligned with the tab 78. The antenna 2 further includes a signal coupling unit that includes a plurality of retaining holes 781 formed in the tab 78 and aligned in the longitudinal direction (A), and a retaining protrusion 913 projecting from the signal feeding leg 91 and selectively into one of the retaining holes 781 so as to form an electrical connection between the signal feeding leg 91 and the first radiating plate 7 that is adjustable in the longitudinal direction (A). The signal feeding leg 91 extends through the elongated opening 48 to connect with a coaxial cable 9 which is to be connected to a transmitter and a receiver (not shown).

FIG. 4 illustrates another preferred embodiment of the plate-type antenna 2 modified from that shown in FIG. 2. Instead of being rectangular in shape and being aligned in the longitudinal direction, the second radiating plate 8 is fan-shaped, and the retaining holes 751 are aligned along an arcuate line.

The design of the plate-type antenna 2 of this invention permits adjustment of the dimension of the radiating plate unit 6, the dimension of the grounding plate unit 3, and the position of the electrical contact between the signal feeding leg 91 and the radiating plate unit 6, thereby eliminating the drawbacks as encountered in the prior art. The plate-type antenna 2 of this invention can be adapted to the Bluetooth communication system which has a bandwidth in a range of from 2.4 to 2.5 GHz and a frequency of 2.45 GHz.

Figure 5:
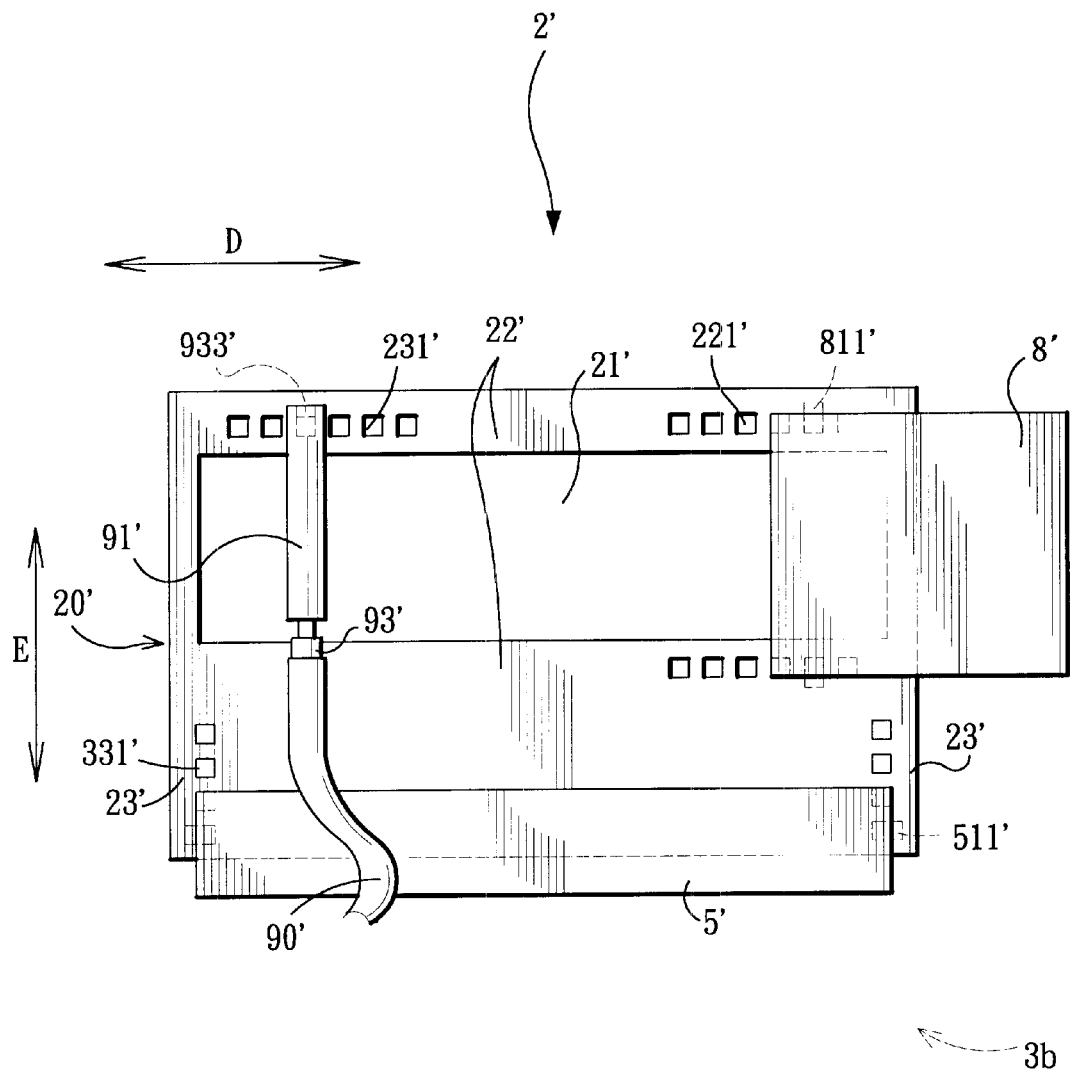
FIG. 5 is a top view of a preferred embodiment of a slot-type antenna of this invention.

FIG. 5 illustrates a preferred embodiment of a slot-type antenna 2' of this invention. The slottype antenna 2' includes: a conductive main plate 20' extending in a longitudinal direction (D), formed with a slot 21', and having a first plate portion 22' that surrounds the slot 21' and that defines a periphery of the slot 21', and a second plate portion 23' that extends from one side of the first plate portion 22' in a transverse direction (E) relative to the longitudinal direction (D); a conductive signal feeding leg 91' electrically connected to the first plate portion 22' of the main plate 20' at one side of the slot 21' that is opposite to the second plate portion 23' and adapted to be connected to an electromagnetic transmitter and an electromagnetic receiver (not shown) a conductive first extension plate 8' electrically and adjustably connected to the first plate portion 22' so as to permit extension and retraction of the main plate 20' in the longitudinal direction (D) and vary the dimension of the slot 21' that is exposed from the main plate 20' and the first extension plate 8'; and a conductive second extension plate 5' electrically and adjustably connected to the second plate portion 23' so as to permit extension and retraction of the main plate 20' in the transverse direction (E). The slot-type antenna 2' is characterized in that tuning of the communication frequency of the same is mainly achieved by adjustment of the dimension of the slot 21', that tuning of the communication bandwidth of the same is mainly achieved by adjustment of the dimension of the second plate portion 23' of the main plate 20', and that adjustment of the input impedance of the same is mainly achieved by varying the position of electrical contact between the signal feeding leg 91' and the second plate portion 22' of the main plate 20'.

A first coupling unit of the antenna 2' includes a plurality of retaining holes 221' formed in the first plate portion 22' of the main plate 20' and aligned in the longitudinal direction (D), and a pair of retaining protrusions 811' projecting from the first extension plate 8' and selectively into one of the retaining holes 221' so as to permit extension and retraction of the main plate 20' along the longitudinal direction (D).

A second coupling unit of the antenna 2' includes a plurality of retaining holes 331' formed in the second plate portion 23' and aligned in the transverse direction (E) and a pair of retaining protrusions 511' projecting from the second extension plate 5' and selectively into one of the retaining holes 331' so as to permit extension and retraction of the main plate 20' along the transverse direction (E).

A third coupling unit of the antenna 2' includes a plurality of retaining holes 231' formed in the first plate portion 22' of the main plate 20' and aligned in the longitudinal direction (D), and a protrusion 933' projecting from the signal feeding leg 91' and selectively into one of the retaining holes 231' so as to form an electrical connection between the signal feeding leg 91' and the first plate portion 22' of the mainplate 20' that is adjustable along the longitudinal direction (D). A coaxial cable 90' has a conductive inner core 92' that is electrically connected to the signal feeding leg 91', and a conductive grounding wire mesh 93' that is radially spaced apart from the inner core 92' via a dielectric sheath and that is electrically connected to the main plate 20'.

Similar to the plate-type antenna 2 of this invention, the slot-type antenna 2' can eliminate the drawbacks as encountered in the prior art.

Figure 7:
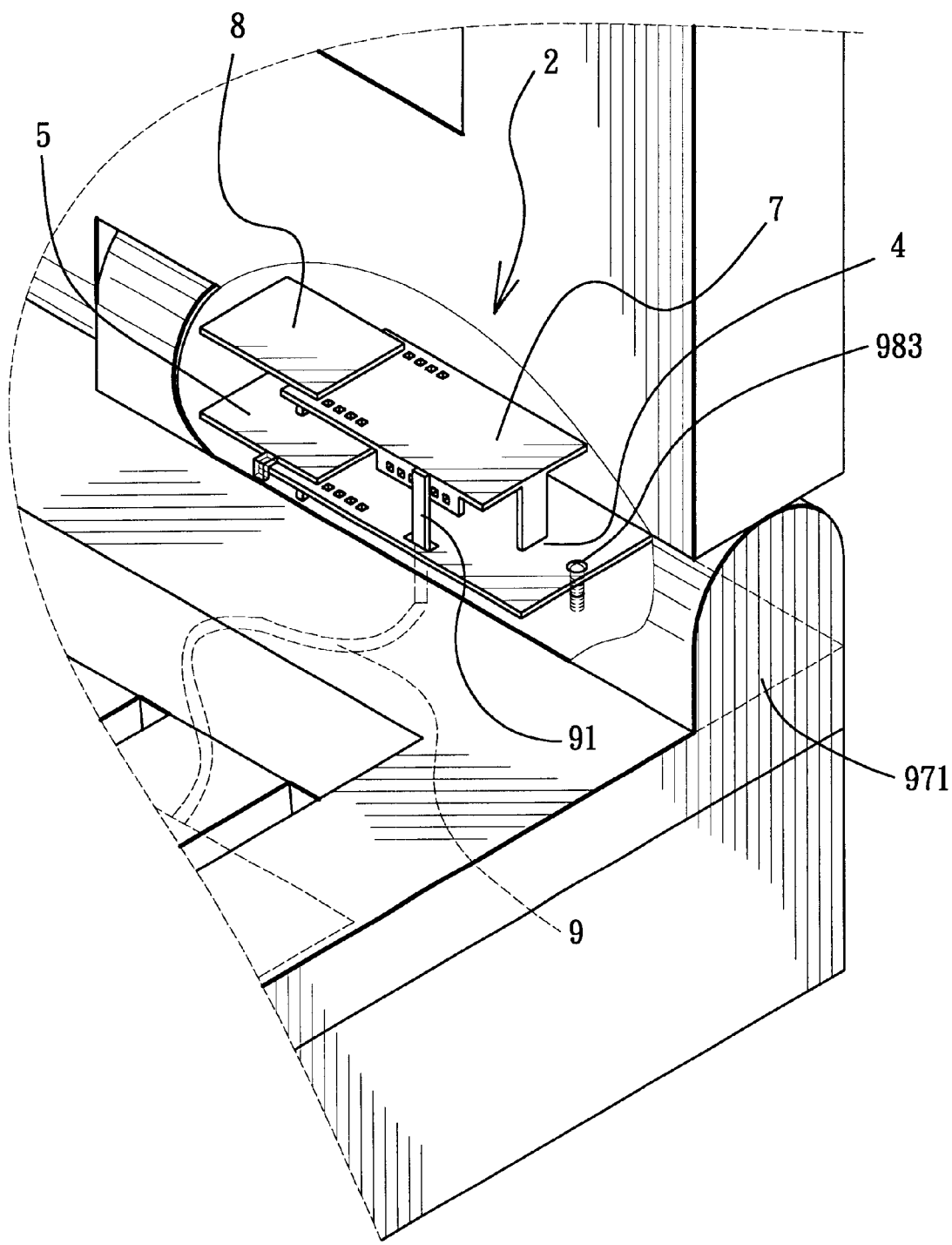
FIG. 7 is an enlarged cutaway view of a portion encircled in FIG. 6.

The antenna 2, 2' of this invention can be built into an electronic device, such as a cellular phone and a portable computer. FIGS. 6 and 7 illustrate a notebook computer with the plate-type antenna of FIG. 2. The notebook computer includes a housing 97 and a circuit board 98 mounted in the housing 97. The housing 97 includes two opposing hinge housing portions 971. The plate-type antenna 2 is mounted in one of the hinge housing portions 971 via screw means 983. The signal feeding leg 91 is electrically connected to the circuit board 98 via the cable 9 so as to provide the notebook computer with a wireless communication feature.

With the invention thus explained, it is apparent that various modifications and variations can be made without departing from the spirit of the present invention.

We claim:

1. A plate-type antenna for an electronic device, comprising:

a conductive radiating plate unit;

a conductive grounding plate unit vertically spaced apart from and electrically connected to said radiating plate unit; and a conductive signal feeding leg electrically connected to said radiating plate unit, spaced apart from said grounding plate unit, and adapted to be connected to an electromagnetic transmitter and an electromagnetic receiver; wherein at least one of said radiating plate unit and said grounding plate unit is extendable, wherein said radiating plate unit includes rectangular first and second radiating plates, said antenna further comprising a radiating coupling unit that includes a plurality of retaining holes formed in one of said first and second radiating plates and aligned in a longitudinal direction, and at least a retaining protrusion projecting from the other one of said first and second radiating plates and selectively into one of said retaining holes so as to permit extension and retraction of said radiating plate unit in said longitudinal direction and so as to couple said first and second radiating plates in a manner that said first and second radiating plates are in face-to-face contact with each other.

2. The plate-type antenna of claim 1, wherein said grounding plate unit includes rectangular first and second grounding plates, said antenna further comprising a grounding coupling unit that includes a plurality of retaining holes formed in one of said first and second grounding plates and aligned in said longitudinal direction, and at least a retaining protrusion projecting from the other one of said first and second grounding plates and selectively into one of said retaining holes in said one of said first and second grounding plates so as to permit extension and retraction of said grounding plate unit in said longitudinal direction and so as to couple said first and second grounding plates in a manner that said first and second grounding plates are in face-to-face contact with each other.

3. A plate-type antenna for an electronic device, comprising:

a conductive radiating plate unit;

a conductive grounding plate unit vertically spaced apart from and electrically connected to said radiating plate unit; and a conductive signal feeding leg electrically connected to said radiating plate unit, spaced apart from said grounding plate unit, and adapted to be connected to an electromagnetic transmitter and an electromagnetic receiver; wherein at least one of said radiating plate unit and said grounding plate unit is extendable, wherein said grounding plate unit includes rectangular first and second grounding plates, said antenna further comprising a grounding coupling unit that includes a plurality of retaining holes formed in one of said first and second grounding plates and aligned in a longitudinal direction, and at least a retaining protrusion projecting from the other one of said first and second grounding plates and selectively into one of said retaining holes so as to permit extension and retraction of said grounding plate unit in said longitudinal direction and so as to couple said first and second grounding plates in a manner that said first and second grounding plates are in face-to-face contact with each other.

4. A plate-type antenna for an electronic device, comprising:

a conductive radiating plate unit;

a conductive grounding plate unit vertically spaced apart from and electrically connected to said radiating plate unit; and a conductive signal feeding leg electrically connected to said radiating plate unit, spaced apart from said grounding plate unit, and adapted to be connected to an electromagnetic transmitter and an electromagnetic receiver; wherein at least one of said radiating plate unit and said grounding plate unit is extendable, wherein said radiating plate unit includes a rectangular first radiating plate with a tab projecting from one side of said first radiating plate, said antenna further comprising a signal coupling unit that includes a plurality of retaining holes formed in said tab and aligned in a longitudinal direction, and a retaining protrusion projecting from said signal feeding leg and selectively into one of said retaining holes so as to form an electrical connection between said signal feeding leg and said first radiating plate that is adjustable in said longitudinal direction.

5. The plate-type antenna of claim 4, wherein said radiating plate unit further includes a rectangular second radiating plate, said antenna further comprising a radiating coupling unit that includes a plurality of retaining holes formed in said first radiating plate and aligned in said longitudinal direction, and at least a retaining protrusion projecting from said second radiating plate and selectively into one of said retaining holes formed in said first radiating plate so as to permit extension and retraction of said radiating plate unit in said longitudinal direction and so as to couple said first and second radiating plates in a manner that said first and second radiating plates are in face-to-face contact with each other.

6. The plate-type antenna of claim 5, wherein said grounding plate unit includes rectangular first and second grounding plates, said antenna further comprising a grounding coupling unit that includes a plurality of retaining holes formed in one of said first and second grounding plates and aligned in said longitudinal direction, and at least a retaining protrusionprojecting fromthe otherone of said first and second grounding plates and selectively into one of said retaining holes in said one of said first and second grounding plates so as to permit extension and retraction of said grounding plate unit in said longitudinal direction and so as to couple said first and second grounding plates in a manner that said first and second grounding plates are in face-to-face contact with each other.

7. The plate-type antenna of claim 6, wherein said first grounding plate is formed with an elongated opening that is vertically aligned with said tab, said signal feeding leg extending from said tab and through said elongated opening.

8. A plate-type antenna for an electronic device, comprising:

a conductive radiating plate unit;

a conductive grounding plate unit vertically spaced apart from and electrically connected to said radiating plate unit; and a conductive signal feeding leg electrically connected to said radiating plate unit, spaced apart from said grounding plate unit, and adapted to be connected to an electromagnetic transmitter and an electromagnetic receiver; wherein at least one of said radiating plate unit and said grounding plate unit is extendable, wherein said radiating plate unit includes a rectangular radiating plate extending in a longitudinal direction, and a fan-like plate, said antenna further comprising a radiating coupling unit that includes a plurality of retaining holes formed in said rectangular radiating plate and aligned along an arcuate line, and at least a retaining protrusion projecting from said fan-like plate and selectively into one of said retaining holes so as to permit extension and retraction of said radiating plate unit along said longitudinal direction.

9. A slot-type antenna for an electronic device, comprising:
a conductive main plate extending in a longitudinal direction, formed with a slot, and having a first plate portion that surrounds said slot and that defines a periphery of said slot, and a second plate portion that extends from one side of said first plate portion in a transverse direction relative to said longitudinal direction;
a conductive signal feeding leg electrically connected to said first plate portion of said main plate and adapted to be connected to an electromagnetic transmitter and an electromagnetic receiver; and
a conductive extension plate electrically, adjustably, and selectively connected to one of said first and second plate portions so as to permit extension and retraction of said main plate in said longitudinal direction and vary the dimension of said slot that is exposed from said main plate and said extension plate when said extension plate is connected to said first plate portion, and so as to permit extension and retraction of said main plate in said transverse direction when said extension plate is connected to said second plate portion.

10. The slot-type antenna of claim 9, further comprising a first coupling unit that includes a plurality of retaining holes formed in said first plate portion of said main plate and aligned in said longitudinal direction, and at least a retaining protrusion projecting from said extension plate and selectively into one of said retaining holes so as to permit extension and retraction of said main plate along said longitudinal direction.

11. The slot-type antenna of claim 10, wherein said extension plate is connected to said first plate portion of said main plate, said slot-type antenna further comprising a conductive second extension plate connected to said second plate portion of said main plate, and a second coupling unit that includes a plurality of retaining holes formed in said second plate portion and aligned in said transverse direction, and at least a retaining protrusion projecting from said second extension plate and selectively into one of said retaining holes in said second plate portion so as to permit extension and retraction of said main plate along said transverse direction.

12. The slot-type antenna of claim 11, further comprising a third coupling unit that includes a plurality of retaining holes formed in said first plate portion of said main plate and aligned in said longitudinal direction, and a protrusion projecting from said signal feeding leg and selectively into one of said retaining holes so as to form an electrical connection between said signal feeding leg and said first plate portion of said main plate that is adjustable in said longitudinal direction.

13. An electronic device, comprising:
a housing;
a circuit board; and
a plate-type antenna mounted in said housing and including
a conductive radiating plate unit,
a conductive grounding plate unit vertically spaced apart from and electrically connected to said radiating plate unit, and
a conductive signal feeding leg electrically connected to said radiating plate unit and said circuit board, and spaced apart from said grounding plate unit, wherein at least one of the dimensions of said radiating plate unit and said grounding plate unit and the position of electrical contact between said signal feeding leg and said radiating plate.unit is adjustable so as to vary electrical characteristics of said antenna, the dimension of said radiating plate unit being adjusted by electrically coupling a conductive extension radiating element to said radiating plate unit and moving the position of said extension radiating element into an extension position or an retraction position relative to said radiating plate unit, the dimension of said grounding plate unit being adjusted by electrically coupling a conductive extension grounding element to said grounding plate unit and moving the position of said extension grounding element into an extensidn position or an retraction position relative to said grounding plate unit.

14. An electronic device, comprising:
a housing;
a circuit board; and
a slot-type antenna mounted in said housing and including a conductive main plate extending in a longitudinal direction, formed with a slot, and having a first plate portion that surrounds said slot and that defines a periphery of said slot, and a second plate portion that extends from one side of said first plate portion in a transverse direction relative to said longitudinal direction, and
a conductive signal feeding leg electrically connected to said first plate portion of said main plate and said circuit board, wherein at least one of the dimensions of said slot and said second plate portion of said main plate and the position of electrical contact between said signal feeding leg and said first plate portion of said main plate is adjustable so as to vary electrical characteristics of said antenna, the dimension of said slot being adjusted by electrically coupling a conductive element to said first plate portion and moving said conductive element into an extension position or an retraction position relative to said slot, the position of electrical contact between said signal feeding leg and said first plate portion being adjusted by providing a plurality of retainers on said first plate portion for retaining said signal feeding leg.

15. A plate-type antenna, comprising:
a conductive radiating plate unit,
a conductive grounding plate unit vertically spaced apart from and electrically connected to said radiating plate unit, and
a conductive signal feeding leg electrically connected to said radiating plate unit and spaced apart from said grounding plate unit, wherein at least one of the dimensions of said radiating plate unit and said grounding plate unit and the position of electrical contact between said signal feeding leg and said radiating plate unit is adjustable so as to vary electrical characteristics of said antenna, the dimension of said radiating plate unit being adjusted by electrically coupling a conductive extension radiating element to said radiating plate unit and moving the position of said extension radiating element into an extension position or an retraction position relative to said radiating plate unit, the dimension of said grounding plate unit being adjusted by electrically coupling a conductive extension grounding element to said grounding plate unit and moving the position of said extension grounding element into an extension position or an retraction position relative to said grounding plate unit.

16. A slot-type antenna, comprising:

a conductive main plate extending in a longitudinal direction, formed with a slot, and having a first plate portion that surrounds said slot and that defines a periphery of said slot, and a second plate portion that extends from one side of said first plate portion in a transverse direction relative to said longitudinal direction, and a conductive signal feeding leg electrically connected to said first plate portion of said main plate, wherein at least one of the dimensions of said slot and said second plate portion of said main plate and the position of electrical contact between said signal feeding leg and said first plate portion of said main plate is adjustable so as to vary electrical characteristics of said antenna, the dimension of said slot being adjusted by electrically coupling a conductive element to said first plate portion and moving said conductive element into an extension position or an retraction position relative to said slot, the position of electrical contact between said signal feeding leg and said first plate portion being adjusted by providing a plurality of retainers on said first plate portion for retaining said signal feeding leg.

* * * * *